United States Patent [19]
Holmgren et al.

[11] Patent Number: 5,815,064
[45] Date of Patent: Sep. 29, 1998

[54] SNOW TEMPERATURE AND DEPTH PROBE

[75] Inventors: Jonathan Alfred Holmgren; Matthew Sturm, both of Fairbanks, Ak.

[73] Assignee: The United States of America as represented by the Secretary of the Army, Washington, D.C.

[21] Appl. No.: 794,922

[22] Filed: Feb. 4, 1997

[51] Int. Cl.[6] ........................................................ H01C 3/04
[52] U.S. Cl. ............................. 338/28; 374/183; 374/165; 29/613
[58] Field of Search ................................... 338/22 R, 28, 338/25, 320, 306; 374/185, 183

[56] References Cited

U.S. PATENT DOCUMENTS

| | | | |
|---|---|---|---|
| 4,276,536 | 6/1981 | Wisnia et al. ............................... | 338/23 |
| 4,492,948 | 1/1985 | Clayton et al. ............................. | 338/25 |
| 4,934,831 | 6/1990 | Volbrecht et al. ......................... | 374/183 |
| 4,955,980 | 9/1990 | Masuo et al. .............................. | 374/185 |
| 5,043,692 | 8/1991 | Sites et al. .................................. | 338/28 |
| 5,111,690 | 5/1992 | Duff et al. .................................. | 73/168 |
| 5,410,291 | 4/1995 | Kuzuoka et al. ...................... | 338/22 R |
| 5,462,359 | 10/1995 | Reichl et al. ............................ | 374/148 |
| 5,498,079 | 3/1996 | Price et al. ............................... | 374/208 |

*Primary Examiner*—Teresa J. Walberg
*Assistant Examiner*—Jeffrey Pwu
*Attorney, Agent, or Firm*—Luther A. Marsh

[57] ABSTRACT

A temperature and depth probe for accurate temperature measurements in snow contains a temperature sensing element such as thermistor placed in a protective cap affixed to the end of a hollow carbon fiber tubed. Wires connected to the ouput terminals of the temperature sensing element pass through the hollow tube to the input terminals of a temperature indicating instruments. The depth of insertion of the probe into the snow is read from depth markings on the side of the hollow tube.

10 Claims, 1 Drawing Sheet

SNOW TEMPERATURE AND DEPTH PROBE

GOVERNMENT INTEREST STATEMENT

The invention described herein may be manufactured, licensed, and used by or for governmental purposes without the payment of any royalties thereon.

BACKGROUND OF THE INVENTION

1. Field of Invention

This invention relates to a temperature measuring probe. More specifically, it relates to a temperature and depth probe for determining the temperature of snow at various depths below the surface of the snow as far as the snow/ground interface.

2. Prior Art

The determination of snow temperature by the insertion into the snow of metallic thermowells having placed in the ends thereof, temperature sensing elements such as thermistors, thermocouples, or resistance thermometers, is known to the art. In snow, where there generally is a temperature gradient, conventional temperature measurement methods employing metallic thermowells generally are inaccurate owing to the conduction of heat along the length of the thermowells, which leads to temperatures induced at the temperature sensing element that are unrepresentative of actual snow temperatures. The determination of the snow temperature gradient near the snow/ground interface, which is of interest in the study of ground freezing and permafrost development in cold regions of the world, is highly inaccurate and unsatisfactory with conventional temperature measurement equipment and techniques.

Representative of prior art temperature sensing systems employing thermistors is U.S. Pat. No. 5,410,291, wherein thermoresistive elements are disposed on ceramic insulating substrates.

Some non-metallic temperature sensing elements have been used in the prior art to measure temperatures in snow. However, these elements were not mounted on a stiff, insertable support rod. Excavation of a snow pit was therefore required for insertion of the temperature sensing element and for temperature measurement in the snow pit wall.

SUMMARY OF THE INVENTION

The object of this invention is to provide an apparatus and a method for accurately determining snow temperature at various depths below the surface of the snow down to the snow/ground interface. It has been found that this object can be achieved by placing a temperature-sensing element, such as a thermistor, thermocouple, or resistance thermometer in a protective cap, which is affixed to one end of a hollow tube made of carbon fiber, with the temperature-sensing element's terminals connected to wires passing through the hollow passage in the carbon fiber tube to a temperature indicating instrument. The hollow tube made of carbon fiber has exceptionally low thermal conductivity. This overcomes a problem encountered with metallic thermowells, as used in the prior art, resulting from heat conduction along the length of the thermowell and leading to temperatures at the temperature-sensing element which are not representative of actual snow temperatures, and generating inaccurate temperature readings at the temperature indicating instrument. Carbon fiber tubes also have high mechanical strength at low temperatures at which some metals turn brittle and fragile, necessitating excavation of a snow pit for insertion of the temperature sensing probe.

The depth of insertion of the temperature probe of this invention into the snow is indicated by graduated tape affixed to the outside of the hollow carbon fiber rod with, for example, clear lacquer or epoxy resin, or by markings made directly on the carbon fiber tube.

DETAILED DESCRIPTION OF THE INVENTION

Figure 1:
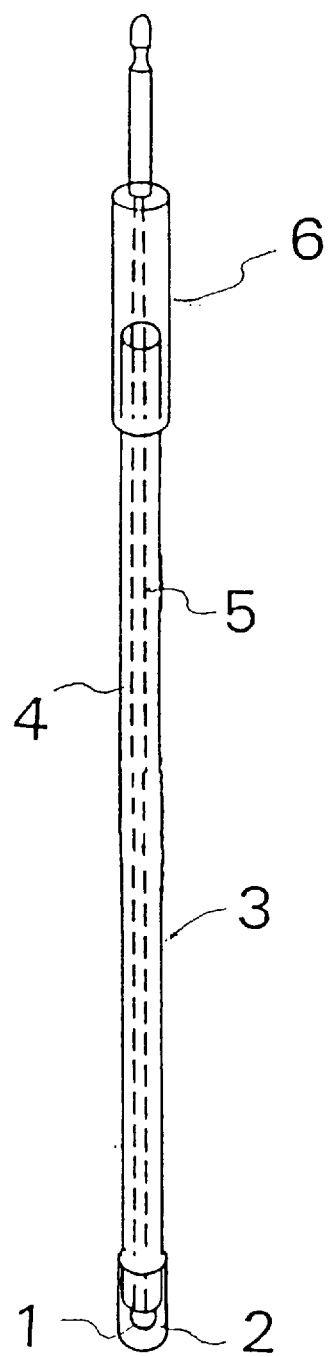
FIG. 1 shows a side-view of the temperature and depth probe of this invention. IV

With reference to FIG. 1, a temperature sensing element 1, such as a thermistor, thermocouple, or resistance thermometer, is placed in a protective cap 2, which is affixed to a hollow tube 3 made of carbon fiber. The temperature sensing element has two output terminals (not shown) which are connected to wires 4 and 5, which connect to a jack 6, typically a phone jack. This jack is connected either directly or through additional wiring to a temperature indicating instrument (not shown), e.g., a thermistor reader with a digital output reading in degrees Centigrade.

An adhesive tape (not shown), graduated in centimeters or inches and legible from a distance of several feet, is typically affixed to the side of the hollow carbon fiber rod, with a reading of zero at the tip. Clear lacquer or epoxy resin may be used to affix the graduated tape to the hollow carbon tube. Alternatively, centimeter or inch markings may be made directly on the side of the carbon fiber tube. The reading at the snow surface equals the depth of insertion of the probe into the snow. The depth reading preferably is taken at the same time that the temperature at the probe tip is read.

The length of the carbon fiber tube and the wiring therein is typically 50–100 cm. The outside diameter of the carbon fiber tube ranges from 5 to 10 mm and the wall thickness from 1 to 4 mm. The protective cap for the temperature-sensing element typically is chrome-plated brass, and it is affixed to the one end of the hollow carbon fiber tube with epoxy resin. The temperature-sensing element may be an Omega Precision Thermistor #44033, and the temperature indicating instrument may be an Omega Thermistor Reader #866, supplied by Omega Engineering Inc., Stamford, Conn. Other temperature sensing elements, such as thermocouples, e.g. iron-constantan, copper-constantan, or chromel-alumel, with appropriate temperature indicating instruments may be used.

Steel and stainless steel tubes have been found to be unsuitable as housings for snow temperature probes owing to heat conduction along the length of the tube either to or away from the tip of the probe where the temperature is to be determined. Furthermore, at very low temperatures, steel tubes may be brittle and fragile. Carbon fiber, owing to its low thermal conductivity and high mechanical strength even at very low temperatures has been found to be superior to steel or stainless steel for constructing snow temperature probes.

It will be understood that the above description of the present invention is susceptible to various modifications, changes, and adaptations, and the same are intended to be comprehended within the meaning and range of equivalents of the appended claims.

What is claimed is:

1. A snow temperature probe for determining the temperature in snow at various depths below the surface of the snow, down to the interface between the snow and the ground, by means of a temperature indicating instrument, comprising (a) an elongated hollow tube made of carbon fiber having affixed to one end thereof, a hollow metal cap forming a housing;

(b) temperature-sensing means electrically connected to insulated wires, the temperature-sensing element being disposed in the hollow metal cap and the wires passing through the hollow tube to the distal end thereof; and (c) means for electrically connecting the wires at the distal end of the hollow tube to input terminals of the temperature indicating instrument;

whereby the temperature of the snow at any level can be accurately measured by inserting the probe into the snow.

2. The probe of claim 1 further comprising graduated markings on the outside of the hollow tube indicating the depth of insertion of the probe into the snow.

3. The probe of claim 1 wherein the protective cap is made of brass.

4. The probe of claim 1 wherein the means for electrically connecting the wires at the distal end of the hollow tube to the input terminals of the temperature indicating instrument is a jack.

5. The probe of claim 2 wherein the markings on the outside of the hollow tube are provided by a tape graduated in units of depth and affixed to the side of the tube.

6. The probe of claim 2 wherein the protective cap is made of brass.

7. The probe of claim 2 wherein the means for electrically connecting the wires at the distal end of the hollow tube to the input terminals of the temperature indicating instrument is a jack.

8. A method of determining snow temperature below the snow surface by inserting the probe of claim 1 at various levels in the snow.

9. A method of determining snow temperature and depth below the snow surface by inserting the probe of claim 2 at various levels in the snow.

10. The probe of claim 2 wherein the temperature-sensing element is selected from the group consisting of thermistor, thermocouple and thermometer.

* * * * *